US012559163B2

(12) United States Patent
Mori et al.

(10) Patent No.: US 12,559,163 B2
(45) Date of Patent: Feb. 24, 2026

(54) CONTROLLER FOR ROTARY ELECTRIC MACHINE, AND ELECTRIC POWER STEERING APPARATUS

(71) Applicant: Mitsubishi Electric Corporation, Tokyo (JP)

(72) Inventors: Tatsuya Mori, Tokyo (JP); Hiroko Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 550 days.

(21) Appl. No.: 18/015,859

(22) PCT Filed: Oct. 5, 2020

(86) PCT No.: PCT/JP2020/037679
§ 371 (c)(1),
(2) Date: Jan. 12, 2023

(87) PCT Pub. No.: WO2022/044347
PCT Pub. Date: Mar. 3, 2022

(65) Prior Publication Data
US 2023/0249742 A1 Aug. 10, 2023

(30) Foreign Application Priority Data
Aug. 28, 2020 (JP) ................................. 2020-144037

(51) Int. Cl.
*B62D 5/04* (2006.01)

(52) U.S. Cl.
CPC ...................................... *B62D 5/046* (2013.01)

(58) Field of Classification Search
CPC ...................................................... B62D 5/046
(Continued)

(56) References Cited

U.S. PATENT DOCUMENTS

2005/0151502 A1 7/2005 Quirion
2006/0125439 A1* 6/2006 Ajima ...................... B60K 6/48
318/716

FOREIGN PATENT DOCUMENTS

JP 2014050123 A * 3/2014
JP 2019050684 A * 3/2019
WO WO-2016117029 A1 * 7/2016 ......... G01D 5/24485

OTHER PUBLICATIONS

International Search Report for PCT/JP2020/037679, dated Dec. 1, 2020.

(Continued)

*Primary Examiner* — Jacob D Knutson
(74) *Attorney, Agent, or Firm* — Sughrue Mion, PLLC

(57) ABSTRACT

To provide a controller for a rotary electric machine and an electric power steering apparatus which can suppress the error increase of the rotational angle due to the high frequency noise component included in the current detection value, while reducing the AC component error included in the sensor detection value of rotational angle, at high rotational speed. A controller for a rotary electric machine estimates an estimation actual angle deviation; calculates a detection angle deviation; calculates a control angle deviation by dividing internally between the estimation actual angle deviation and the detection angle deviation; calculates a rotational angle for control by performing feedback control so that the control angle deviation approaches 0; and makes the ratio of the estimation actual angle deviation higher than the ratio of the detection angle deviation, when the rotational speed is higher than a speed threshold value.

11 Claims, 7 Drawing Sheets

(58) Field of Classification Search
USPC ................................................ 180/443, 446
See application file for complete search history.

(56)     References Cited

OTHER PUBLICATIONS

European Search Report issued Feb. 5, 2024 in Patent Application No. 20951596.4.
Communication issued Nov. 24, 2025 in European Patent Application No. 20951596.4.

* cited by examiner

CONTROLLER FOR ROTARY ELECTRIC MACHINE, AND ELECTRIC POWER STEERING APPARATUS

CROSS REFERENCE TO RELATED APPLICATIONS

This application is a National Stage of International Application No. PCT/JP2020/037679 filed Oct. 5, 2020, claiming priority based on Japanese Patent Application No. 2020-144037 filed Aug. 28, 2020.

TECHNICAL FIELD

The present disclosure is related with a controller for a rotary electric machine, and an electric power steering apparatus.

BACKGROUND ART

In order to control the rotary electric machine which has a magnet in a rotor, it is necessary to detect the rotational angle of the rotor. In the rotational angle detected by the rotation sensor, there is an error with respect to a true rotational angle. A DC component of the sensor angle error becomes a DC component error of torque, and an AC component of the sensor angle error becomes an AC component error (torque ripple error) of torque. The torque ripple error causes an unwanted sound from the rotary electric machine. Accordingly, in order to rotate the rotary electric machine in a silent state, it is important to reduce the AC component of the angle error.

The technology of patent document 1 estimates the axial error $\Delta\theta dc$ by the axial error calculator 605; calculates the correction amount $\Delta\omega 1c$ which controls the axial error $\Delta\theta dc$ to 0 by the electrical angle speed correction calculator 603; calculates the electrical angle speed $\omega 1c$ after correction by adding the correction amount $\Delta\omega 1c$ to electrical angle speed $\omega 1sc$ detected by the normal rotary position sensor; and calculates the rotor phase $\theta dc$ based on the electrical angle speed $\omega 1c$.

CITATION LIST

Patent Literature

Patent document 1: JP 2019-050684 A

SUMMARY OF INVENTION

Technical Problem

However, in the technology of patent document 1, the correction amount $\Delta\omega 1c$ which sets the estimated axial error $\Delta\theta dc$ to 0 is added to the electrical angle speed $\omega 1sc$ detected by the normal rotary position sensor. Accordingly, when the AC component error is included in the electrical angle speed $\omega 1sc$, in order to compensate the AC component error, the axial error $\Delta\theta dc$ and the correction amount $\Delta\omega 1c$ need to respond at the AC component frequency. Since the AC component frequency is proportional to the rotational frequency, the AC component frequency increases as the rotational speed increases. In order to make the correction amount $\Delta\omega 1c$ respond at the rotational frequency at high rotational speed, it is necessary to increase the response frequency of the feedback control which calculates the correction amount $\Delta\omega 1c$, up to the maximum rotational frequency. If the response frequency of the feedback control is increased, it also responds to the high frequency noise component included in the current detection value used for calculation of the axial error $\Delta\theta dc$, and a noise component is superimposed on the correction amount $\Delta\omega 1c$. That is to say, in the technology of patent document 1, at high rotational speed, the error reduction of the AC component included in the sensor detection value of rotational angle and the increase in error due to the noise component included in the current detection value become a relation of trade-off, and it is difficult to detect the rotational angle with good accuracy.

Then, the purpose of the present disclosure is to provide a controller for a rotary electric machine and an electric power steering apparatus which can suppress the error increase of the rotational angle due to the high frequency noise component included in the current detection value, while reducing the AC component error included in the sensor detection value of rotational angle, at high rotational speed.

Solution to Problem

A controller for a rotary electric machine of the present disclosure that controls the rotary electric machine which is provided with a stator having plural-phase windings and a rotor having a magnet via an electric power converter, the controller for the rotary electric machine including:

a rotation detection unit that detects a rotational angle of the rotor, based on an output signal of a rotation sensor;

an angle calculation unit for control that calculates a rotational angle for control of the rotor;

a current detection unit that detects currents which flow into the plural-phase windings, based on an output signal of a current sensor;

a voltage command value calculation unit that calculates voltage command values applied to the plural-phase windings, based on the rotational angle for control and current detection values; and a switching control unit that turns on and off a plurality of switching devices which the electric power converter has, based on the voltage command values, wherein the angle calculation unit for control estimates an estimation actual angle deviation which is a deviation of the rotational angle for control with respect to a true rotational angle of the rotor, based on information on the current detection values and information on the voltage command values;

calculates a detection angle deviation which is a deviation of the rotational angle for control with respect to a detection value of rotational angle;

calculates a value obtained by dividing internally between the estimation actual angle deviation and the detection angle deviation, as a control angle deviation;

calculates the rotational angle for control by performing feedback control so that the control angle deviation approaches 0;

makes a ratio of the estimation actual angle deviation in the control angle deviation higher than a ratio of the detection angle deviation, when a speed proportional physical value which is a physical value proportional to a rotational angle speed of the rotor is higher than a preliminarily set speed threshold value; and makes the ratio of the estimation actual angle deviation in the control angle deviation lower than the ratio of the detection angle deviation, when the speed proportional physical value is lower than the speed threshold value.

An electric power steering apparatus of the present disclosure, including:

the controller for the rotary electric machine, the electric power converter, the rotary electric machine, and a driving force transmission mechanism which transmits a driving force of the rotary electric machine to a steering apparatus of a vehicle, wherein a response frequency from the control angle deviation to the rotational angle for control is set to 90 Hz or more.

Advantage of Invention

According to the controller for the rotary electric machine and the electric power steering apparatus according to the present disclosure, since the rotational angle for control is calculated by performing feedback control so that the control angle deviation which is obtained by dividing internally between the estimation actual angle deviation and the detection angle deviation approaches 0, it is not configured so as to correct the sensor detection value of rotational angle speed by a feedback control value like patent document 1; and at high rotational speed, it is not necessary to make a response frequency of feedback control high so as to reduce an error of AC component included in the sensor detection value of rotational angle. Accordingly, the response frequency of feedback control can be set so as to respond a mechanical vibrational frequency of the rotational angle which is comparatively low frequency, and can be set so as not to respond a noise component frequency of the current detection value which is comparatively high frequency. And, since the ratio of the estimation actual angle deviation is made comparatively higher than the ratio of the detection angle deviation at the high rotational speed, and the rotational angle for control is calculated by the feedback control which makes the control angle deviation approach 0, the error of AC component included in the sensor detection value of rotational angle can be suppressed from being reflected on the rotational angle for control, and the rotational angle for control can be approached to the true rotational angle. Therefore, while reducing the error of AC component included in the sensor detection value of rotational angle at the high rotational speed, the increase in error of the rotational angle due to the high frequency noise component included in the current detection value can be suppressed. Even when the ratio of the detection angle deviation is made higher than the ratio of the estimation actual angle deviation at the low rotation speed, since the rotational angle for control is calculated by the feedback control which makes the control angle deviation approach 0, the error of AC component included in the sensor detection value of rotational angle can be suppressed from being reflected on the rotational angle for control.

DETAILED DESCRIPTION OF THE EMBODIMENTS

1. Embodiment 1

Figure 1:
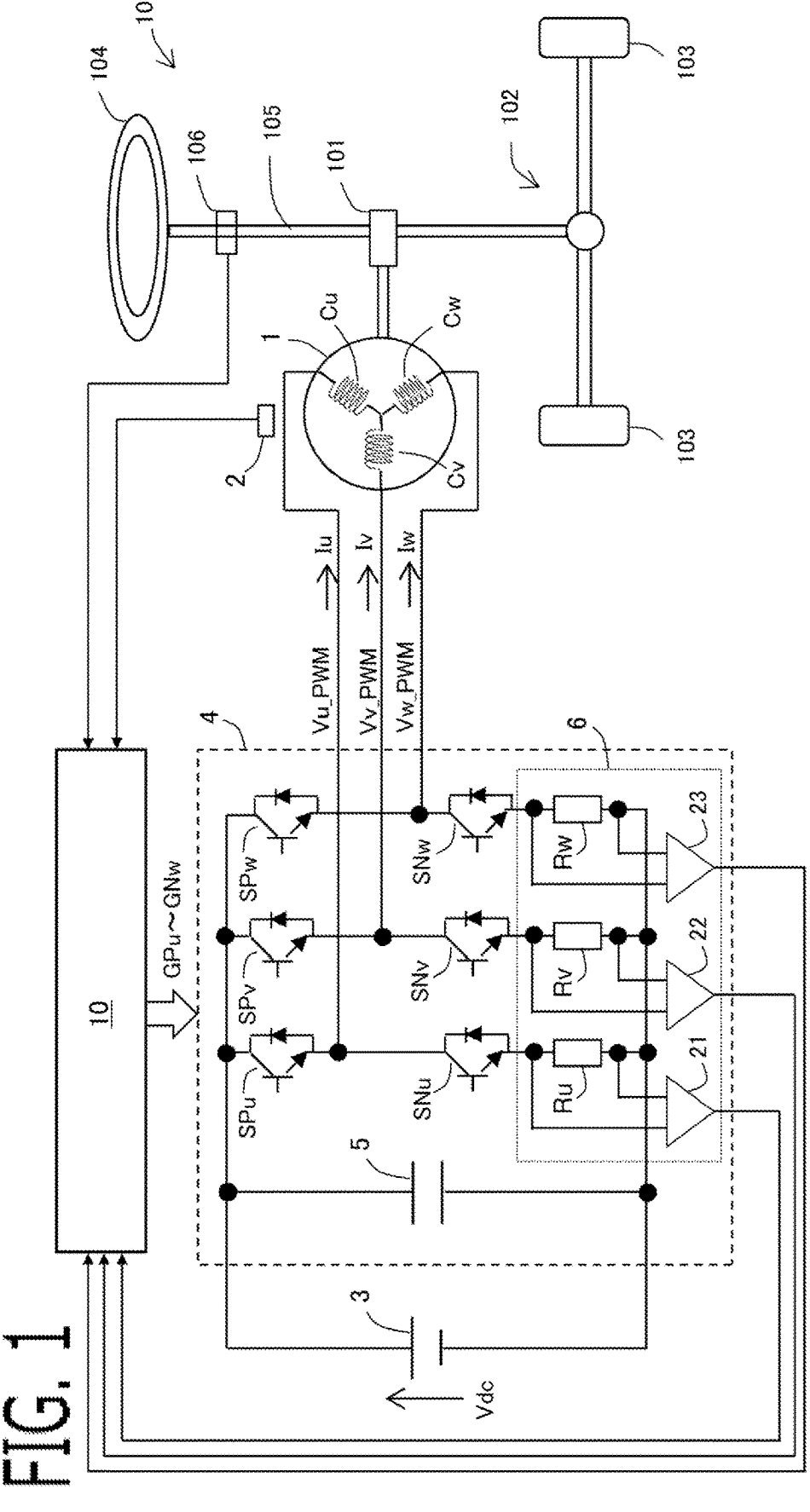
FIG. 1 is a schematic configuration diagram of the rotary electric machine, the electric power converter, and the controller according to Embodiment 1.

A controller 10 for a rotary electric machine (hereinafter, referred to simply as the controller 10) according to Embodiment 1 will be explained with reference to drawings. FIG. 1 is a schematic configuration diagram of a rotary electric machine 1, an electric power converter 4, and the controller 10 according to the present embodiment. In the present embodiment, the rotary electric machine 1 is used as a driving force source of an electric power steering apparatus 100. The rotary electric machine 1, the electric power converter 4, and the controller 10 constitute the electric power steering apparatus 100.

1-1. Rotary Electric Machine 1

The rotary electric machine 1 is provided with a stator and a rotor disposed on the radial-direction inner side of the stator. The stator is provided with plural-phase windings (in this example, three-phase windings Cu, Cv, Cw of U phase, V phase, and W phase). The rotor is provided with a magnet. In the present embodiment, the magnet is permanent magnet, and the rotary electric machine 1 is a synchronous permanent magnet type synchronous rotary electric machine. The magnet may be an electromagnet which has field winding. The three-phase windings may be connected by star connection, or may be connected by A connection.

The rotor is provided with a rotation sensor 2 for detecting a rotational angle of the rotor. Resolver, encoder, or MR sensor is used for the rotation sensor 2. An output signal of the rotation sensor 2 is inputted into the controller 10.

1-2. Electric Power Converter 4

As the electric power converter, an inverter is used. As the electric power converter 4, an electric power converter other than the inverter, for example, a matrix converter, may be used.

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to each phase of three phases. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase. A smoothing capacitor 5 is connected between the positive electrode side and the negative electrode side of the DC power source 3.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 10 via a gate drive circuit and the like. The each switching device is turned on or turned off by the switching signals GPu to GNw outputted from the controller 10.

The DC power source 3 outputs a DC voltage Vdc to the inverter 4. In the present embodiment, the DC voltage Vdc is set to 12V. The DC power source 3 may be any apparatus which outputs the DC voltage Vdc, such as a battery, a DC-DC converter, a diode rectifier, and a PWM rectifier. A voltage sensor which detects the DC voltage Vdc may be provided in the DC power source 3, and an output signal of the voltage sensor may be inputted into the controller 10. The controller 10 may control using the detected DC voltage Vdc.

A current sensor 6 which detects current which flows into the winding of each phase is provided. The current sensors 6 is a current sensor, such as shunt resistance or Hall element. An output signal of the current sensor 6 is inputted into the controller 10.

In the present embodiment, the current sensor 6 is provided in the series circuit of two switching devices of each phase. A resistor Ru of U phase, a resistor Rv of V phase, and a resistor Rw of W phase are connected in series to the negative electrode side of the negative electrode side switching device SN of each phase. About the resistors Ru, Rv, Rw of three phases, both ends potential difference of the resistor of each phase is detected by an amplifier 21, 22, 23, and the both ends potential difference is inputted into the controller 10.

The current sensor 6 may be provided on a wire which connects the series circuit of two switching devices of each phase, and the coil of each phase. Alternatively, a current sensor may be provided on the wire which connects between the inverter 4 and the DC power source 3, and the current of the winding of each phase may be detected by well-known "bus line one-shunt system."

1-3. Electric Power Steering Apparatus 100

The electric power steering apparatus 100 is provided with the controller for the rotary electric machine 10, the inverter 4, the rotary electric machine 1, and a driving force transmission mechanism 101 that transmits the driving force of the rotary electric machine 1 to a steering apparatus 102 of a vehicle.

The rotation axis of the rotor of the rotary electric machine 1 is connected with the steering apparatus 102 of the wheels 103 via the driving force transmission mechanism 101. For example, the electric power steering apparatus 100 is provided with a handle 104 that a driver rotates right and left, a shaft 105 that is connected with the handle 104 and transmits a steering wheel torque by the handle 104 to the steering apparatus 102 of the wheels 103, a torque sensor 106 that is mounted on the shaft 105 and detects a steering torque Ts by the handle 104, and a driving force transmission mechanisms 101, such as a worm gear mechanism, which connects the rotation axis of the electric rotary machine 1 with the shaft 105. The output signal of the torque sensor 106 is inputted into the controller 10 (the input circuit 92).

1-4. Controller 10

Figure 2:
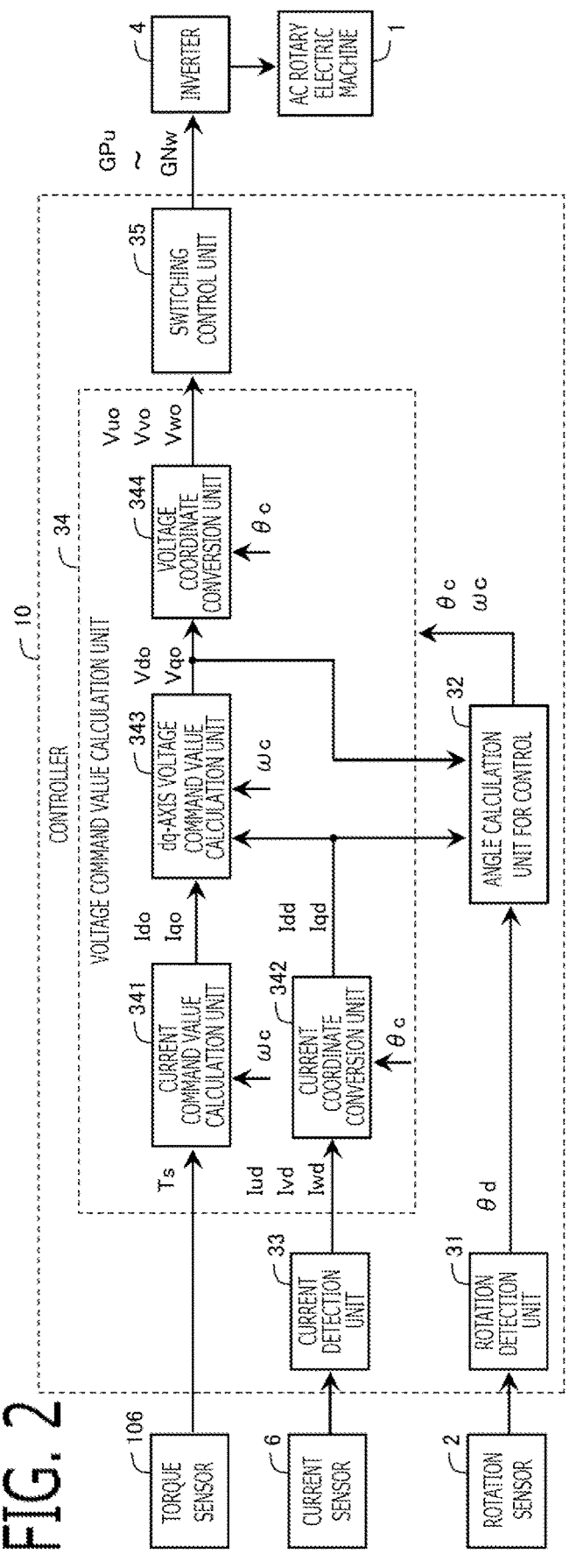
FIG. 2 is a schematic block diagram of the controller according to Embodiment 1.
Figure 3:
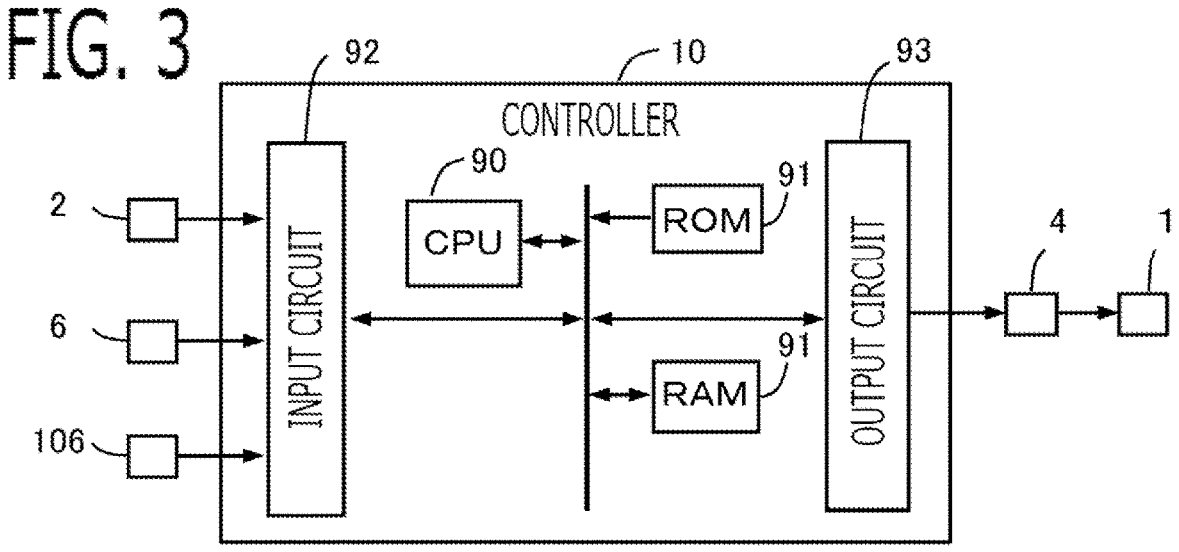
FIG. 3 is a hardware configuration diagram of the controller according to Embodiment 1.

The controller 10 controls the rotary electric machine 1 via the inverter 4. As shown in FIG. 2, the controller 10 is provided with a rotation detection unit 31, an angle calculation unit for control 32, a current detection unit 33, a voltage command value calculation unit 34, a switching control unit 35, and the like. Each function of the controller 10 is realized by processing circuits provided in the controller 10. Specifically, as shown in FIG. 3, the controller 10 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the rotation sensor 2, the current sensor 6, and the torque sensor 106, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 10, such as the storage apparatus 91, the input circuit 92, and the output circuit 93, so that the respective functions of the control units 31 to 35 provided in the controller 10 are realized. Setting data items such as an internal division ratio, a control gain to be utilized in the control units 31 to 35 are stored, as part of software items (programs), in the storage apparatus 91 such as a ROM. Each function of the controller 10 will be explained in detail below.

1-4-1. Basic Control

The rotation detection unit 31 detects a rotational angle θd of the rotor, based on the output signal of the rotation sensor 2. As the detection value of rotational angle θd of the rotor, a rotational angle (a magnetic pole position) of the magnetic pole (N pole) of the magnet in the electrical angle with respect to the winding position of U phase is detected.

The current detection unit 33 detects currents Iud, Ivd, Iwd which flow into the three-phase windings, based on the output signal of the current sensor 6. The current detection unit 33 detects the current Iud which flows into the winding of U phase, detects the current Ivd which flows into the winding of V phase, and detects the current Iwd which flows into the winding of W phase, based on the output signal of the current sensor 6. The current sensor 6 may detect the winding currents of two phases, and the winding current of the remaining one phase may be calculated based on the detection values of winding currents of two phases. For example, the current sensor 6 may detect the winding currents Ivd, Iwd of V phase and W phase, and the winding current Iud of U phase may be calculated by Iud=−Ivd−Iwd.

The voltage command value calculation unit 34 calculates voltage command values of three phases Vuo, Vvo, Vwo applied to the three-phase windings, based on the rotational angle for control θc which was calculated by the angle calculation unit for control 32 described below, and the current detection values.

In the present embodiment, the voltage command value calculation unit 34 is provided with a current command value calculation unit 341, a current coordinate conversion unit 342, a dq-axis voltage command value calculation unit 343, and a voltage coordinate conversion unit 344.

The current coordinate conversion unit 342 converts the current detection values of three-phase windings Iud, Ivd, Iwd into current detection values of d-axis and q-axis Idd, Iqd, based on the rotational angle for control θc. In the present embodiment, as shown in the next equation, the current coordinate conversion unit 342 converts the current detection values of three-phase windings Iud, Ivd, Iwd into the current detection values of d-axis and q-axis Idd, Iqd, by performing a three-phase/two-phase conversion and a rotating coordinate conversion based on the rotational angle for control θc.

$$\begin{bmatrix} Idd \\ Iqd \end{bmatrix} = \sqrt{\frac{2}{3}} \begin{bmatrix} \cos\theta c & \cos\left(\theta c - \frac{2\pi}{3}\right) & \cos\left(\theta c + \frac{2\pi}{3}\right) \\ -\sin\theta c & -\sin\left(\theta c - \frac{2\pi}{3}\right) & -\sin\left(\theta c + \frac{2\pi}{3}\right) \end{bmatrix} \begin{bmatrix} Iud \\ Ivd \\ Iwd \end{bmatrix} \quad (1)$$

The d-axis is defined in a direction of the magnetic pole (the N pole) of the magnet, and the q-axis is defined in a direction advanced to the d-axis by 90 degrees in the electrical angle. In this example, since the coordinate conversion is performed based on rotational angle for control θc, a direction of the rotational angle for control θc becomes the d-axis.

The current command value calculation unit 341 calculates current command values of d-axis and q-axis Ido, Iqo. The current command value calculation unit 341 detects a steering wheel torque of the driver Ts, based on the output signal of the torque sensor 106. Then, as shown in the next equation, the current command value calculation unit 341 sets the current command value of q-axis Iqo, based on the steering torque Ts, and sets the current command value of d-axis Ido to 0. That is to say, the Id=0 control is performed. In the Id=0 control, the current command value of d-axis Ido is set to 0. The Id=0 control is suitable for a surface magnet type rotary electric machine.

$$Iqo = Ka \times Ts$$

$$Ido = 0 \quad (2)$$

Herein, Ka is a constant, but it may be changed according to the steering torque Ts, the travelling speed of vehicle, and the like. The current command value of q-axis Iqo may be set using the well-known compensation control according to the steering condition. In the case of an embedded magnet type rotary electric machine, instead of the Id=0 control, the current command values of d-axis and q-axis Ido, Iqo may be set by the maximum torque/current control. In the maximum torque/current control, the current command values of d-axis and q-axis Ido, Iqo which maximize the generated torque with respect to the same current are calculated.

In a region where a rotational angle speed is high, the magnetic flux weakening control which increases the current command value of d-axis Ido in the negative direction from the current command value of d-axis calculated by the Id=0 control or the maximum torque/current control is performed. For example, the execution region of the magnetic flux weakening control is set to a region where the rotational angle speed ω becomes greater than or equal to the base speed that the amplitude of the line voltage outputted from the inverter reaches the DC voltage Vdc.

Figure 4:
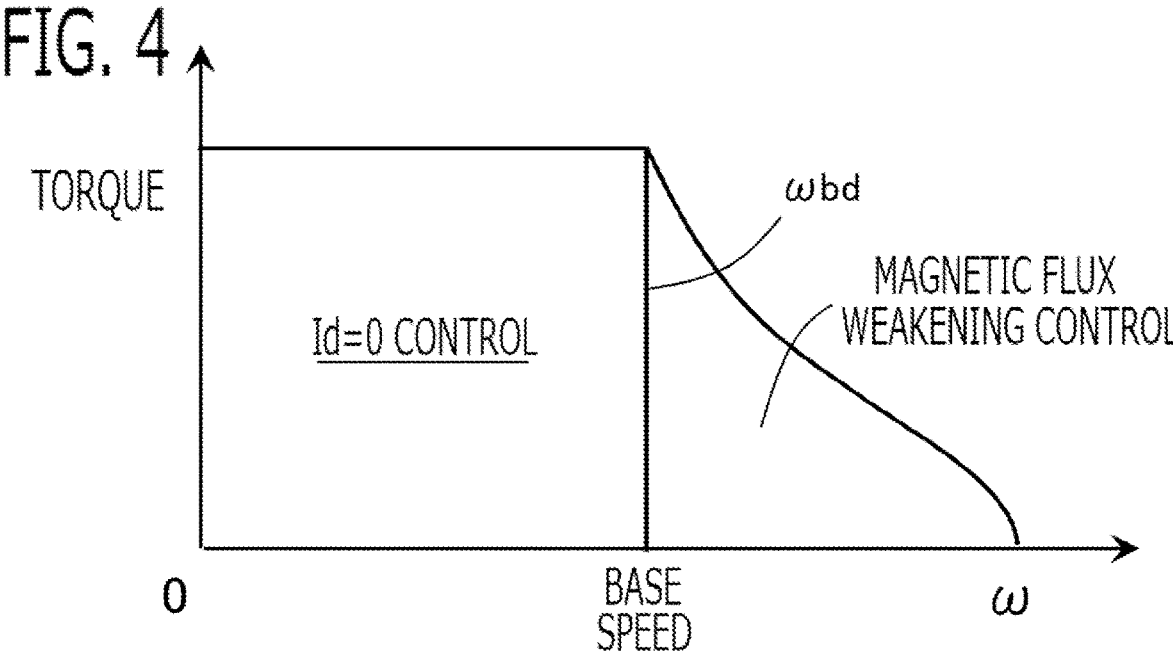
FIG. 4 is a figure explaining control regions according to Embodiment 1.
Figure 5:
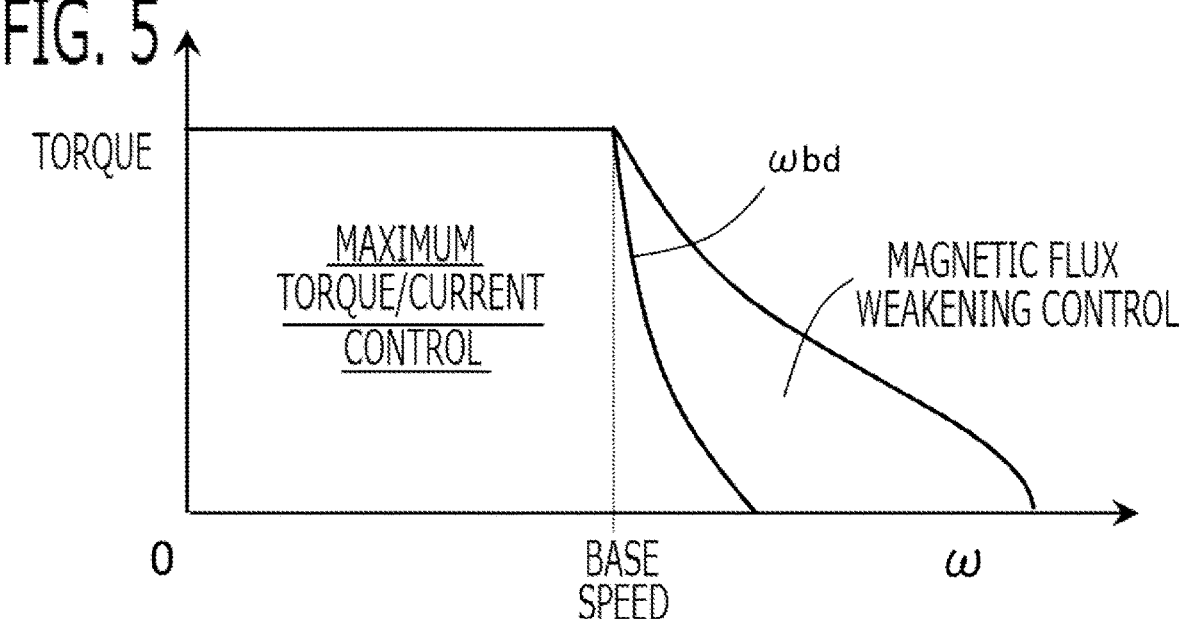
FIG. 5 is a figure explaining control regions according to Embodiment 1.

FIG. 4 shows the execution region of each control when the Id=0 control and the magnetic flux weakening control are performed in the surface magnet type rotary electric machine. FIG. 5 shows the execution region of each control when the maximum torque/current control and the magnetic flux weakening control are performed in the embedded magnet type rotary electric machine.

As shown in the next equation, the dq-axis voltage command values calculation unit 343 performs a current feedback control that changes the voltage command value of d-axis Vdo and the voltage command value of q-axis Vqo by PI control or the like, so that the current detection value of d-axis Idd approaches the current command value of d-axis Ido, and the current detection value of q-axis Iqd approaches the current command value of q-axis Iqo.

$$Vdo = Kd\left(1 + \frac{1}{Td \times s}\right)(Ido - Idd)$$

$$Vqo = Kq\left(1 + \frac{1}{Tq \times s}\right)(Iqo - Iqd) \quad (3)$$

Herein, Kd and Kq are proportional gains, Td and Tq are integral time constants, and s is a Laplace operator.

A feedforward control for non-interfering between the d-axis current and the q-axis current may be performed. That is to say, "−ωc×Lq×Iqc" may be added to the voltage command value of d-axis Vdo, and "ωc×(Ld×Idc+ψ)" may be added to the voltage command value of q-axis Vqo. Herein, ωc is the rotational angle speed for control described below. Instead of ωc, the detection value of rotational angle speed ωd described below may be used. Lq is an inductance of q-axis, Ld is an inductance of d-axis, ψ is an interlinkage flux that the magnetomotive force of the magnet interlinks to the winding.

The voltage coordinate conversion unit 344 converts the voltage command values of d-axis and q-axis Vdo, Vqo into the voltage command values of three phases Vuo, Vvo, Vwo, based on the rotational angle for control θc. In the present embodiment, as shown in the next equation, the voltage coordinate conversion unit 344 converts the voltage command values of d-axis and q-axis Vdo, Vqo into the voltage command values of three phases Vuo, Vvo, Vwo, by performing a fixed coordinate conversion and a two-phase/three-phase conversion based on rotational angle for control θc.

$$\begin{bmatrix} Vuo \\ Vvo \\ Vwo \end{bmatrix} = \sqrt{\frac{2}{3}} \begin{bmatrix} \cos\theta c & -\sin\theta c \\ \cos\left(\theta c - \frac{2\pi}{3}\right) & -\sin\left(\theta c - \frac{2\pi}{3}\right) \\ \cos\left(\theta c + \frac{2\pi}{3}\right) & -\sin\left(\theta c + \frac{2\pi}{3}\right) \end{bmatrix} \begin{bmatrix} Vdo \\ Vqo \end{bmatrix} \quad (4)$$

The voltage coordinate conversion unit 344 may add well-known modulation, such as the two-phase modulation and the third order harmonic wave superimposing, to the voltage command values of three phases Vuo, Vvo, Vwo.

The switching control unit 35 turns on and off the plurality of switching devices which the inverter 4 has, based on the voltage command values of three phases Vuo, Vvo, Vwo. The switching control unit 35 uses well-known the carrier wave comparison PWM or the space vector PWM.

When the carrier wave comparison PWM is used, the switching control unit 35 compares a carrier wave with each of the voltage command values of three phases Vuo, Vvo, Vwo, and turns on and off the plurality of switching devices based on a comparison result. The carrier wave is a triangular wave which vibrates with an amplitude of half value of DC voltage Vdc/2 centering on 0, at the PWM period Tc. About each phase, the switching control unit 35 turns on the switching signal GP of the positive electrode side switching device and turns on the positive electrode side switching device when the carrier wave is less than the voltage command value; and turns off the switching signal GP of the positive electrode side switching device and turns off the positive electrode side switching device when the carrier wave exceeds the voltage command value. On the other hand, about each phase, the switching control unit 35 turns off the switching signal GN of the negative electrode side switching device and turns off the negative electrode side switching device when the carrier wave is less than the voltage command value; and turns on the switching signal GN of the negative electrode side switching device and turns on the negative electrode side switching device when the carrier wave exceeds the voltage command value. About each phase, between the on period of the positive electrode side switching device and the on period of the negative electrode side switching device, a short circuit prevention period (dead time) when both of the positive electrode side and the negative electrode side switching device are turned off may be provided.

When the space vector PWM is used, the switching control unit 35 generates a voltage command vector from the voltage command values of three phases Vuo, Vvo, Vwo; determines an output time division of seven basic voltage vectors in the PWM period based on the voltage command vector; and generates the switching signal which turns on and off each switching device in the PWM period, based on the output time division of seven basic voltage vectors.

1-4-2. Angle Calculation Unit for Control 32

The angle calculation unit for control 32 calculates a rotational angle for control θc of the rotor. The angle calculation unit for control 32 estimates an estimation actual angle deviation Δθe which is a deviation of the rotational angle for control θc with respect to a true rotational angle of the rotor, based on information on the current detection values, and information on the voltage command values. The angle calculation unit for control 32 calculates a detection angle deviation Δθd which is a deviation of the rotational angle for control θc with respect to the detection value of rotational angle θd. Then, the angle calculation unit for control 32 calculates a value obtained by dividing internally between the estimation actual angle deviation Δθe and the detection angle deviation Δθd, as the control angle deviation Δθc. Then, the angle calculation unit for control 32 calculates the rotational angle for control θc by performing feedback control so that the control angle deviation Δθc approaches 0.

When a speed proportional physical value which is a physical value proportional to a rotational angle speed of the rotor is higher than a preliminarily set speed threshold value Th, the angle calculation unit for control 32 makes a ratio Ke of the estimation actual angle deviation Δθe in the control angle deviation Δθc higher than a ratio Kd of the detection angle deviation. When the speed proportional physical value is lower than the speed threshold value Th, the angle calculation unit for control 32 makes the ratio Ke of the estimation actual angle deviation Δθe in the control angle deviation Δθc lower than the ratio Kd of the detection angle deviation.

According to this configuration, since the rotational angle for control θc is calculated by performing feedback control so that the control angle deviation Δθc which was obtained by dividing internally between the estimation actual angle deviation Δθe and the detection angle deviation Δθd approaches 0, it is not configured so as to correct the sensor detection value of rotational angle speed by a feedback control value like patent document 1; and at high rotational speed, it is not necessary to make a response frequency of feedback control high so as to reduce an error of AC component included in the sensor detection value of rotational angle. Accordingly, the response frequency of feedback control can be set so as to respond a mechanical vibrational frequency of the rotational angle which is comparatively low frequency, and can be set so as not to respond a noise component frequency of the current detection value which is comparatively high frequency. And, since the ratio Ke of the estimation actual angle deviation Δθe is made comparatively higher than the ratio Kd of the detection angle deviation Δθd at the high rotational speed, and the rotational angle for control θc is calculated by the feedback control which makes the control angle deviation Δθc approach 0, the error of AC component included in the detection value of rotational angle θd can be suppressed from being reflected on the rotational angle for control θc, and the rotational angle for control θc can be approached to the true rotational angle. Therefore, while reducing the error of AC component included in the detection value of rotational angle θd at the high rotational speed, the increase in error of the rotational angle due to the high frequency noise component included in the current detection value can be suppressed. Even when the ratio Kd of the detection angle deviation Δθd is made higher than the ratio Ke of the estimation actual angle deviation Δθe at the low rotation speed, since the rotational angle for control θc is calculated by the feedback control which makes the control angle deviation Δθc approach 0, the error of AC component included in the detection value of rotational angle θd can be suppressed from being reflected on the rotational angle for control θc.

<Calculation of Detection Angle Deviation Δθd>

Figure 6:
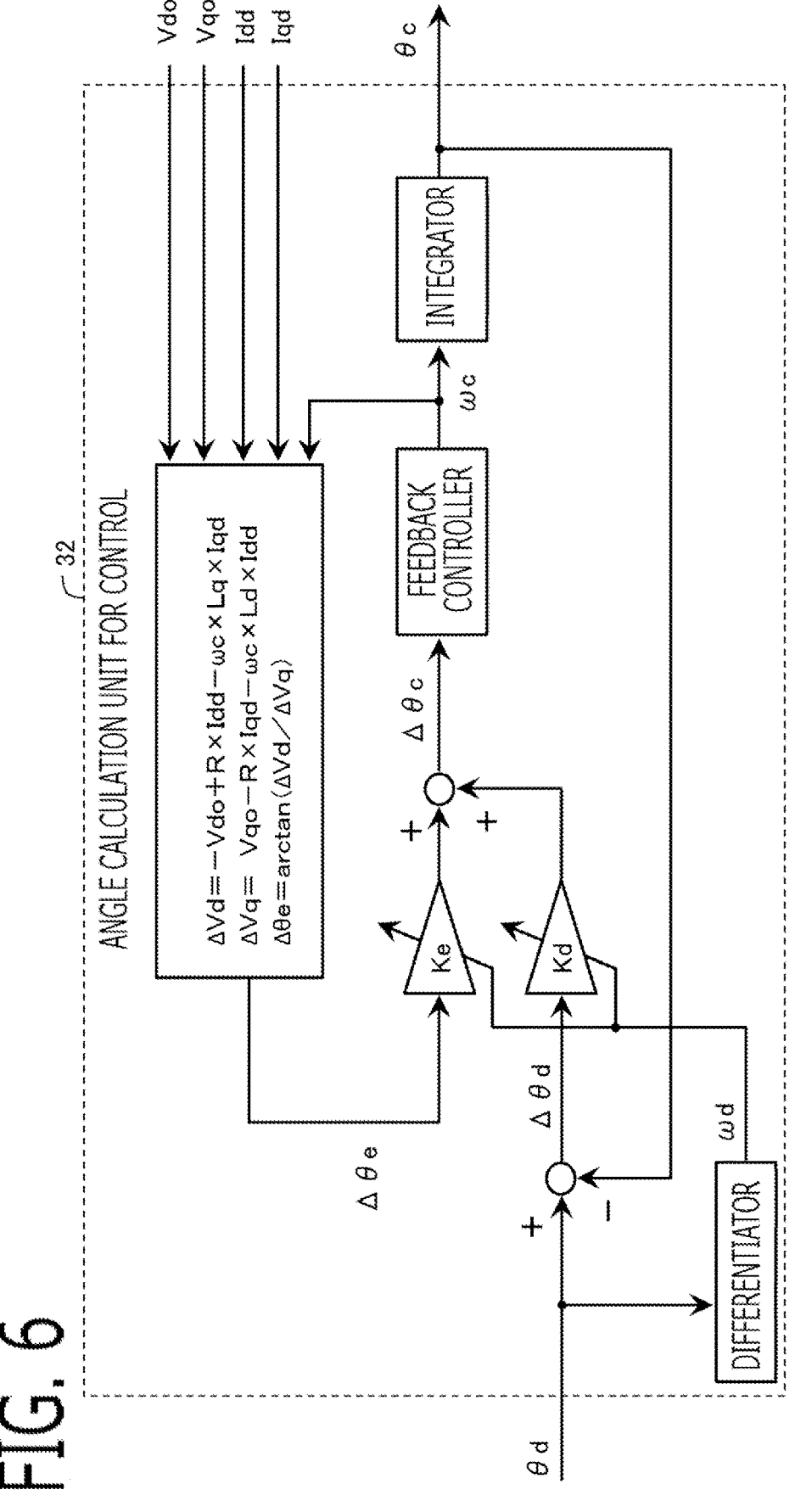
FIG. 6 is a block diagram of the angle calculation unit for control according to Embodiment 1.

FIG. 6 shows the block diagram of the angle calculation unit for control 32 according to the present embodiment. As shown in the next equation, the angle calculation unit for control 32 calculates the detection angle deviation Δθd by subtracting the rotational angle for control θc from the detection value of rotational angle θd.

$$\Delta\theta d = \theta d - \theta c \qquad (5)$$

<Calculation of Estimation Actual Angle Deviation Δθe>

As mentioned above, the angle calculation unit for control 32 estimates the estimation actual angle deviation Δθe which is a deviation of the rotational angle for control θc with respect to the true rotational angle of the rotor, based on information on the current detection values, and information on the voltage command values. In the present embodiment, the angle calculation unit for control 32 estimates the estimation actual angle deviation Δθe which is a deviation of the rotational angle for control θc with respect to the true rotational angle of the rotor, based on the current detection values of d-axis and q-axis Idd, Iqd, the voltage command values of d-axis and q-axis Vdo, Vqo, and the rotational angle speed for control ωc.

The angle calculation unit for control 32 calculates the estimation actual angle deviation Δθe using the next equation.

$$\Delta Vd = -Vdo + R \times Idd - \omega c \times Lq \times Iqd$$

$$\Delta Vq = Vqo - R \times Iqd - \omega c \times Ld \times Idd$$

$$\Delta \theta e = \arctan(\Delta Vd / \Delta Vq) \tag{6}$$

Herein, R is a preliminarily set resistance value of winding, Lq is a preliminarily set inductance of q-axis, and Ld is a preliminarily set inductance of d-axis. Ld and Lq may be set using map data of d-axis current and q-axis current, considering the magnetic saturation of the permanent magnet. The equation (6) is an equation derived based on the voltage equation, ΔVd is an error of the d-axis voltage due to a deviation of the rotational angle for control θc from the actual rotational angle (herein, a rotational angle that the voltage equation is established), ΔVq is an error of the q-axis voltage due to a deviation of the rotational angle for control θc from the actual rotational angle. Then, by calculating a value of arctangent function of ΔVd/ΔVq, the estimation actual angle deviation Δθe which is a deviation of the rotational angle for control θc with respect to the true rotational angle is calculated.

Instead of the rotational angle speed for control ωc, the detection value of rotational angle speed ωd calculated by differentiating the detection value of rotational angle θd may be used. Instead of the voltage command values of d-axis and q-axis Vdo, Vqo, U phase applied voltage Vu_PWM, V phase applied voltage Vv_PWM, and W phase applied voltage Vw_PWM applied to three-phase windings may be detected, and voltage detection values Vdd, Vqd of d-axis and q-axis which are obtained by performing the three-phase/two-phase conversion and the rotating coordinate conversion based on the rotational angle for control θc to the voltage detection values of three phases Vu_PWM, Vv_PWM, Vw_PWM may be used.

When an absolute value of the detection value of rotational angle speed ωd is smaller than a threshold value, the angle calculation unit for control 32 may stop the calculation of the estimation actual angle deviation Δθe using the equation (6), and may set Δθe to 0. This is to prevent the error ΔVq of q-axis voltage from becoming close to 0, prevent ΔVd/ΔVq from becoming large too much, and prevent a calculation error of Δθe from becoming large too much, in the case of low rotational angle speed.

<Calculation of Detection Value of Rotational Angle Speed ωd>

The angle calculation unit for control 32 calculates the detection value of rotational angle speed ωd, using the next equation.

$$\omega d(n) = \{\theta d(n) - \theta d(n-1)\} / \Delta T \tag{7}$$

Herein, θd(n−1) is the rotational angle detected at the last time calculation timing, and θd(n) is the rotational angle detected at this time calculation timing. ΔT is a calculation period. As the detection value of rotational angle speed ωd, a value obtained by performing a low pass filter processing to a calculation value of the equation (7) may be used.

<Calculation of Control Angle Deviation Δθc by Internal Division>

As shown in the next equation, the angle calculation unit for control 32 calculates a value obtained by totaling a value obtained by multiplying an internal division ratio Ke of the estimation actual angle deviation to the estimation actual angle deviation Δθe, and a value obtained by multiplying an internal division ratio Kd of the detection angle deviation to the detection angle deviation Δθd, as the control angle deviation Δθc.

$$\Delta \theta c = Ke \times \Delta \theta e + Kd \times \Delta \theta d$$

$$Ke + Kd = 1, \; 0 <= Ke <= 1, \; 0 <= Kd <= 1 \tag{8}$$

Herein, the internal division ratio Ke of the estimation actual angle deviation is a ratio Ke of the estimation actual angle deviation Δθe in the control angle deviation Δθc, and the internal division ratio Kd of the detection angle deviation is a ratio Kd of the detection angle deviation Δθd in the control angle deviation Δθc. The internal division ratio Ke of the estimation actual angle deviation and the internal division ratio Kd of the detection angle deviation are set within a range from 0 to 1, respectively, so that a total value of the internal division ratio Ke of the estimation actual angle deviation and the internal division ratio Kd of the detection angle deviation becomes 1.

It is set that Kd=1−Ke. Accordingly, it becomes that (Δθc−Δθe):(Δθd−Δθc)=Ke:(1−Ke). The control angle deviation Δθc becomes a value obtained by dividing internally the estimation actual angle deviation Δθe and the detection angle deviation Δθd to a ratio of Ke:(1−Ke).

<Variation of Internal Division Ratio According to Speed Proportional Physical Value>

Figures 7, 8:
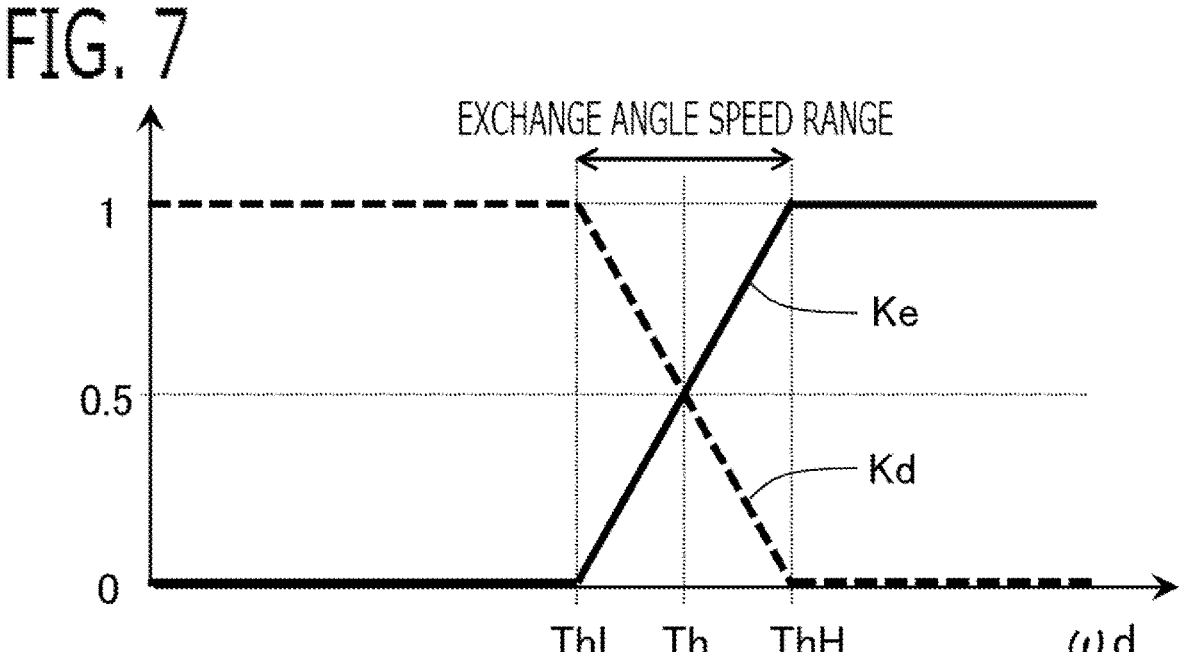
FIG. 7 is a figure explaining setting of the internal division ratio according to Embodiment 1.
FIG. 8 is a Bode diagram explaining the response frequency according to Embodiment 1.

FIG. 7 shows a setting example of the internal division ratios Ke, Kd according to the present embodiment. In the present embodiment, as the speed proportional physical value, the detection value of rotational angle speed ωd is used. When the detection value of rotational angle speed ωd is higher than a preliminarily set speed threshold value Th, the angle calculation unit for control 32 makes the internal division ratio Ke of the estimation actual angle deviation higher than the internal division ratio Kd of the detection angle deviation. When the detection value of the rotational angle speed ωd is lower than the speed threshold value Th, the angle calculation unit for control 32 makes the internal division ratio Ke of the estimation actual angle deviation lower than the internal division ratio Kd of the detection angle deviation. That is, when the detection value of rotational angle speed ωd is higher than the speed threshold value Th, the angle calculation unit for control 32 makes the internal division ratio Ke of the estimation actual angle deviation higher than 0.5, and makes the internal division ratio Kd of the detection angle deviation lower than 0.5. And, when the detection value of rotational angle speed ωd is lower than the speed threshold value Th, the angle calculation unit for control 32 makes the internal division ratio Ke of the estimation actual angle deviation lower than 0.5, and makes the internal division ratio Kd of the detection angle deviation higher than 0.5. Instead of the detection value of rotational angle speed ωd, the rotational angle speed for control ωc may be used.

The angle calculation unit for control 32 makes the internal division ratio Ke of the estimation actual angle deviation increase continuously, and makes the internal division ratio Kd of the detection angle deviation decrease continuously, as the detection value of rotational angle speed ωd increases in a preliminarily set range of the speed proportional physical value including the speed threshold value Th (in this example, a range of the rotational angle speed, hereinafter, refer to as an exchange angle speed range).

A value obtained by subtracting a predetermined value from the speed threshold value Th becomes a lower limit angle speed ThL of the exchange angle speed range; a value obtained by adding a predetermined value to the speed threshold value Th becomes an upper limit angle speed ThH of the exchange angle speed range; and the exchange angle speed range becomes a range from the lower limit angle speed ThL to the upper limit angle speed ThH. In the example shown in FIG. 7, the exchange angle speed range is set so that the speed threshold value Th becomes a center in the exchange angle speed range.

According to this configuration, by changing the internal division ratios Ke, Kd continuously in the exchange speed range, when a difference exists between the estimation actual angle deviation Δθe and the detection angle deviation Δθd, it can be suppressed that the control angle deviation Δθc changes steeply, and it can be suppressed that the rotational angle for control θc changes steeply and the torque changes steeply. Accordingly, it can be suppressed that the steering feeling of driver is deteriorated. The internal division ratios Ke and Kd may be changed in step before and after the speed threshold value Th.

The angle calculation unit for control 32 makes the internal division ratio Ke of the estimation actual angle deviation increase continuously from 0 to 1, and makes the internal division ratio Kd of the detection angle deviation decrease continuously from 1 to 0, as the detection value of rotational angle speed ωd increases in the exchange angle speed range including the speed threshold value Th. When the detection value of rotational angle speed ωd is lower than the exchange angle speed range, the angle calculation unit for control 32 sets the internal division ratio Ke of the estimation actual angle deviation to 0, and sets the internal division ratio Kd of the detection angle deviation to 1. When the detection value of rotational angle speed ωd is higher than the exchange angle speed range, the angle calculation unit for control 32 sets the internal division ratio Ke of the estimation actual angle deviation to 1, and sets the internal division ratio Kd of the detection angle deviation to 0.

<Setting of Speed Threshold Value Th Corresponding to Execution Region of Magnetic Flux Weakening Control>

The speed threshold value Th is set corresponding to the rotational angle speed ωbd at a boundary between an execution region of the Id=0 control or the maximum torque/current control, and an execution region of the magnetic flux weakening control. In the following, the effect of this setting will be explained.

A torque error ΔTerr if there is an angle error Δθerr can be approximated like the next equation.

$$\Delta Terr \approx Iq \times \cos(\Delta\theta err) + Id \times \sin(\Delta\theta err) \quad (9)$$

Since the angle error Δθerr is close to 0 even if there is error, it become that cos(Δθerr)<<sin(Δθerr), and the first term of the right side of the equation (9) can be ignored. Accordingly, the torque error ΔTerr becomes large when the absolute value of the d-axis current Id becomes large. As mentioned above, in the magnetic flux weakening control, the current command value of d-axis Ido is increased in the negative direction from the current command value of d-axis calculated by the Id=0 control or the maximum torque/current control. Accordingly, in the execution region of the magnetic flux weakening control, the absolute value of the d-axis current Id becomes large, and the torque error ΔTerr becomes large if there is the angle error Δθerr. By setting the speed threshold value Th as described above, the internal division ratio Ke of the estimation actual angle deviation is made high in the execution region of the magnetic flux weakening control, and the rotational angle for control θc is calculated so that the estimation actual angle deviation Δθe decreases. Accordingly, the deviation (the estimation actual angle deviation Δθe) of the rotational angle for control θc with respect to the true rotational angle becomes small, and the angle error Δθerr becomes small. As explained using the equation (6), the true rotational angle is a rotational angle that the voltage equation is established, and the torque error ΔTerr of the equation (9) is also derived based on the voltage equation. Accordingly, by calculating the rotational angle for control θc so that the estimation actual angle deviation Δθe decreases, the torque error ΔTerr can be decreased. The calculation accuracy of the estimation actual angle deviation Δθe of the equation (6) becomes high when the induced voltage becomes high. Accordingly, in the region where the magnetic flux weakening control is executed and the induced voltage becomes high, by making the internal division ratio Ke of the estimation actual angle deviation high, the reduction accuracy of the angle error Δθerr can be made high.

In the present embodiment, when the detection value of rotational angle speed ωd becomes larger than the lower limit angle speed ThL of the exchange angle speed range, the estimation actual angle deviation Δθe is reflected on calculation of the rotational angle for control θc. Accordingly, the rotational angle speed ωbd at the boundary between the execution region of the Id=0 control or the maximum torque/current control and the execution region of the magnetic flux weakening control should become greater than or equal to the lower limit angle speed ThL of the exchange angle speed range. The speed threshold value Th and the exchange angle speed range may be set so that the rotational angle speed ωbd at the boundary between the execution region of the Id=0 control or the maximum torque/current control and the execution region of the magnetic flux weakening control becomes greater than or equal to the lower limit angle speed ThL of the exchange angle speed range. For example, the speed threshold value Th may be set so as to coincide with the rotational angle speed ωbd at the boundary. Alternatively, the speed threshold value Th and the exchange angle speed range may be set so that the rotational angle speed ωbd at the boundary is included in the exchange angle speed range. As shown in FIG. 5, in the case of the embedded magnet type rotary electric machine, since the rotational angle speed ωbd at the boundary changes according to the torque, the speed threshold value Th and the exchange angle speed range may be changed according to the torque.

Alternatively, in the embedded magnet type rotary electric machine, since the d-axis current becomes a value smaller than 0 also in the maximum torque/current control, the speed threshold value Th and the exchange angle speed range may be set in the execution region of the maximum torque/current control.

As the speed proportional physical value, the rotational angle speed for control ωc may be used. As the speed proportional physical value, a physical values other than the rotational angle speed may be used. For example, the induced voltage generated in winding is proportional to the rotational angle speed, and the applied voltage of winding is proportional to the induced voltage. As the speed proportional physical value, a magnitude of the voltage vector of the voltage command values of d-axis and q-axis Vdo, Vqo, or a sum of a square of Vdo and a square of Vqo may be used.

When the DC voltage Vdc becomes lower than a voltage threshold, the angle calculation unit for control 32 may fix the internal division ratio Ke of the estimation actual angle deviation to 0, and fix the internal division ratio Kd of the detection angle deviation to 1, so that the estimation actual angle deviation Δθe is not be reflected on the control angle deviation Δθc. This is because of the following reasons. As the DC voltage Vdc decreases, the base speed decreases and the magnetic flux weakening control is performed from lower rotational speed. However, since the induced voltage is low at the low rotation speed, the estimation accuracy of the estimation actual angle deviation Δθe by the equation (6) deteriorates.

<Calculation of Rotational Angle for Control θc Based on Control Angle Deviation Δθc>

As mentioned above, the angle calculation unit for control 32 calculates the rotational angle for control θc by performing feedback control so that the control angle deviation Δθc approaches 0. In the present embodiment, the angle calculation unit for control 32 changes the rotational angle speed for control ωc by performing feedback control so that the control angle deviation Δθc approaches 0, and calculates the rotational angle for control θc by integrating with the rotational angle speed for control ωc.

According to this configuration, by changing the rotational angle speed for control ωc by feedback control, it is not necessary to change the rotational angle for control θc directly by feedback control, and it is not necessary to increase the response frequency of feedback control up to the rotational frequency. Accordingly, the response frequency of feedback control can be set lower than the rotational frequency, and can be set according to the mechanical vibrational frequency of the rotational angle speed.

For example, as shown in the next equation, the angle calculation unit for control 32 changes the rotational angle speed for control ωc by PI control so that the control angle deviation Δθc approaches 0.

$$\omega c = Kc \times (1 + 1/(Tc \times s)) \times \Delta\theta c \qquad (10)$$

Herein, Kc is a proportional gain, Tc is an integral time constant, and s is a Laplace operator. Instead of PI control, various kinds of feedback controls, such as PID control, may be used.

<Response Frequency from Δθc to θc>

The transfer function G from the control angle deviation Δθc to the rotational angle for control θc becomes the next equation.

$$G(s) = \theta c/\Delta\theta c = Kc \times (1 + 1/(Tc \times s))/s \qquad (11)$$

Figure 9:
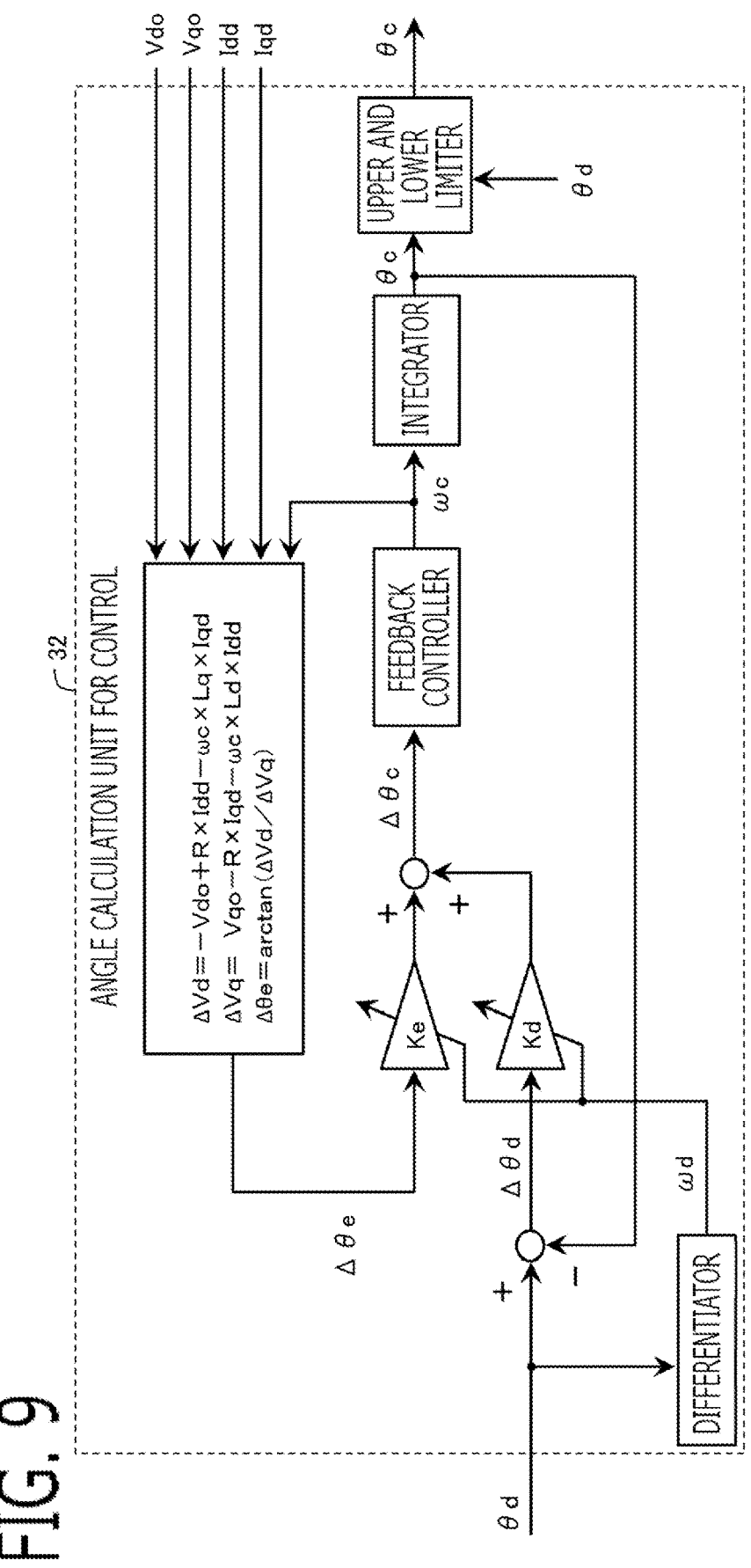
FIG. 9 is a block diagram of the angle calculation unit for control according to Embodiment 2.

According to FIG. 9 of non-patent document 1 (Kurishige, et al, "A new control strategy to reduce steering torque for vehicles equipped with electric power steering", Transactions of the Japan Society of Mechanical Engineers (Series C), vol. 68 no. 675), it is seen that the steering speed of the steering is vibrating at about 35 Hz (since 0.1 sec is about 3.5 periods in FIG. 9). Accordingly, true speed variation of the steering may occur at frequency of this level. Accordingly, the response from the control angle deviation Δθc to the rotational angle for control θc is required to be 35 Hz or more. 90 to 100 Hz of about 3 times is preferable with a margin. 175 Hz of 5 times or more is more preferable. This vibration frequency of rotational angle speed corresponds to the mechanical resonance frequency of the power transfer mechanism connected to the rotation axis of the rotor.

Herein, FIG. 8 shows the Bode diagram of the transfer function G of the equation (11). Herein, it is set that Tc=5/Kc. According to this figure, the transfer function G becomes 0 dB at ω=Kc [rad/s], and becomes characteristics of a first-order low pass filter whose cutoff frequency is the proportional gain Kc [rad/s]. Herein, since it becomes −20 dB/dec in the vicinity of 0 dB, this must be the first-order low pass filter.

Accordingly, in the response from the control angle deviation Δθc to the rotational angle for control θc, when the input angular frequency ω is less than or equal to the proportional gain Kc, θc responds so as to be Δθc=0. When the input angular frequency ω exceeds Kc, θc cannot follow to variation of Δθc.

Then, that the response from the control angle deviation Δθc to the rotational angle for control θc is required to be 35 Hz or more means that the proportional gain Kc is required to be 2π×35 [rad/s] or more. Further, with a margin, in order to set the response to 90 to 100 Hz of about 3 times, the proportional gain Kc is required to be 2π×90 to 2π×100 [rad/s]. In order to set the response to 175 Hz of 5 times or more, the proportional gain Kc is required to be 2π×175 [rad/s] or more. As described above, the proportional gain Kc is required to be at least 2π×35 [rad/s]. Considering a margin, the proportional gain Kc is required to be 2π×90 to 2π×100 [rad/s] of about its 3 times. More preferably, the proportional gain Kc may be 2π×175 [rad/s] or more.

By setting the proportional gain Kc in this way, the response frequency (the cutoff frequency) from the control angle deviation Δθc to the rotational angle for control θc can be made higher than 35 Hz which is the frequency of the true speed variation; the rotational angle for control θc can be made to follow the true speed variation; and it can be suppressed that the torque variation is generated according to the angle error. On the other hand, the high frequency vibration component of the control angle deviation Δθc due to the noise component included in the current detection value or the noise component included in the angle detection value is cut off, and it can be not reflected on the rotational angle for control θc. Accordingly, by setting the response frequency (cutoff frequency) from the control angle deviation Δθc to the rotational angle for control θc between a 3 times value and a 5 times value of the frequency of the true speed variation (for example, 90 Hz or more), the rotational angle for control θc can be made to follow the true speed variation, and it can be hardly influenced by the noise component of the current detection value. As a result, the torque variation can be reduced and the rotary electric machine can be silenced.

And, the response frequency (the cutoff frequency) from the control angle deviation Δθc to the rotational angle for control θc is set lower than a rotational frequency corresponding to the speed threshold value Th. According to this configuration, in a region where the rotational speed is higher than the speed threshold value Th, and the internal division ratio Ke of the estimation actual angle deviation Δθe becomes higher than the internal division ratio Kd of the detection angle deviation Δθd, the noise component of the rotational frequency included in the current detection value and the like can be suppressed from being reflected on the rotational angle for control θc.

And, the response frequency (the cutoff frequency) from the control angle deviation Δθc to the rotational angle for control θc is set higher than the mechanical resonance frequency (in this example, 35 Hz) which occurs in the rotational speed of the rotor. Especially, the response frequency (the cutoff frequency) from the control angle deviation $\Delta\theta c$ to the rotational angle for control $\theta c$ may be set between a 3 times value and a 5 times value of the mechanical resonance frequency (in this example, 35 Hz) which occurs in the rotational speed of the rotor. According to this configuration, the rotational angle for control $\theta c$ can be made to follow the mechanical variation of the rotational angle speed, and it can be hardly influenced by the high frequency noise component.

On the other hand, as mentioned above, in the technology of patent document 1, the feedback controller which calculates $\Delta\omega 1c$ requires the following performance of frequency up to the maximum rotational speed, a high-grade microcomputer is required, and it is difficult to separate the noise component in the current detection value included in $\Delta\theta dc$. On the other hand, in the present disclosure, the response frequency can be set according to the frequency of the true speed variation which is lower than the maximum rotational frequency, and the frequency following performance like patent document 1 is unnecessary. Accordingly, separation of the noise component in the current detection value is easy, and a low-grade microcomputer (CPU) can be used.

2. Embodiment 2

The rotary electric machine 1, the electric power converter 4, and the controller 10 according to Embodiment 2 will be explained. The explanation for constituent parts the same as those in Embodiment 1 will be omitted. The basic configuration of the rotary electric machine 1, the electric power converter 4, and the controller 10 according to the present embodiment is the same as that of Embodiment 1. Embodiment 2 is different from Embodiment 1 in that the upper and lower limitation is performed to the rotational angle for control $\theta c$. FIG. 9 is a block diagram of the angle calculation unit for control 32.

In the present embodiment, the angle calculation unit for control 32 calculates an upper limit value $\theta cmax$ and a lower limit value $\theta cmin$ of the rotational angle for control, based on the detection value of rotational angle $\theta d$. Then, when the rotational angle for control $\theta c$ deviates from a range from the upper limit value $\theta cmax$ to the lower limit value $\theta cmin$, the angle calculation unit for control 32 corrects the rotational angle for control $\theta c$, based on the detection value of rotational angle $\theta d$.

For example, as shown in the next equation, the angle calculation unit for control 32 calculates the upper limit value $\theta cmax$ and the lower limit value $\theta cmin$, by adding and subtracting a preliminarily set limitation angle width $\Delta\theta lmt$ to the detection value of rotational angle $\theta d$. The limitation angle width $\Delta\theta lmt$ is set to less than 90 degrees in the electrical angle, for example.

$$\theta cmax = \theta d + \Delta\theta lmt$$

$$\theta cmin = \theta d - \Delta\theta lmt \qquad (12)$$

Then, as shown in the next equation, the angle calculation unit for control 32 upper and lower limits the rotational angle for control $\theta c$ by the upper limit value $\theta cmax$ and the lower limit value $\theta cmin$.

1) In the case of $\theta c > \theta cmax$ $$\theta c = \theta cmax$$

2) In the case of $\theta c < \theta cmin$ $$\theta c = \theta cmin$$

3) $\theta cmin <= \theta c <= \theta cmax$ $$\theta c = \theta c \qquad (13)$$

In this way, by limiting the rotational angle for control $\theta c$ by the upper limit value $\theta cmax$ and the lower limit value $\theta cmin$ which are set based on the detection value of rotational angle $\theta d$, even when abnormality occurs in the calculated value of the rotational angle for control $\theta c$, the rotational angle for control $\theta c$ can be kept in the appropriate range, and the performance of the rotary electric machine can be prevented from being significantly deteriorated.

The present disclosure can also be used for a case where the rotation sensor is multiplexed. For example, in a case where the rotation sensor of dual system (for example, the resolver of dual system or the MR sensor of dual system) is used, the rotational angle detected by the rotation sensor of normal one system may be used as the detection value of rotational angle $\theta d$.

The rotary electric machine 1 may be a driving force source of various kinds of apparatuses other than the electric power steering apparatus 100. For example, the rotary electric machine 1 may be a driving force source of wheels.

The stator may be provided with windings of a plurality of phases other than three phases (for example, two phases, four phases).

The stator is provided with a plurality of pairs (for example, two pairs) of three-phase windings, and each part of the inverter and the controller may be provided corresponding to the three-phase windings of each pair.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Rotary Electric Machine, 2: Rotation Sensor, 3: DC power Source, 4: Electric Power Converter, 6: Current Sensor, 10: Controller for Rotary Electric Machine, 31: Rotation Detection Unit, 32: Angle Calculation Unit for Control, 33: Current Detection Unit, 34: Voltage Command Value Calculation Unit, 35: Switching Control Unit, 100: Electric Power Steering Apparatus, 101: Driving Force Transmission Mechanism, 102: Steering Apparatus, Kd: Ratio of detection angle deviation (internal division ratio), Ke: Ratio of estimation actual angle deviation (internal division ratio), Th: Speed threshold value, $\Delta\theta c$: Control angle deviation, $\Delta\theta d$: Detection angle deviation, $\Delta\theta e$: Estimation actual angle deviation, $\theta c$: Rotational angle for control, $\theta cmax$: Upper limit value, $\theta cmin$: Lower limit value, $\theta d$: Detection value of rotational angle, $\omega c$: Rotational angle speed for control, $\omega d$: Detection value of rotational angle speed

What is claimed is:

1. A controller for a rotary electric machine that controls the rotary electric machine which is provided with a stator having plural-phase windings and a rotor having a magnet via an electric power converter, the controller for the rotary electric machine comprising at least one processor configured to implement:

a rotation detector that detects a rotational angle of the rotor, based on an output signal of a rotation sensor;

an angle calculator for control that calculates a rotational angle for control of the rotor;

a current detector that detects currents which flow into the plural-phase windings, based on an output signal of a current sensor;

a voltage command value calculator that calculates voltage command values applied to the plural-phase windings, based on the rotational angle for control and current detection values; and a switching controller that turns on and off a plurality of switching devices which the electric power converter has, based on the voltage command values, wherein the angle calculator for control estimates an estimation actual angle deviation which is a deviation of the rotational angle for control with respect to a true rotational angle of the rotor, based on information on the current detection values and information on the voltage command values;

calculates a detection angle deviation which is a deviation of the rotational angle for control with respect to a detection value of the rotational angle;

calculates a value obtained by dividing internally between the estimation actual angle deviation and the detection angle deviation, as a control angle deviation;

calculates the rotational angle for control by performing feedback control so that the control angle deviation approaches 0;

makes a ratio of the estimation actual angle deviation in the control angle deviation higher than a ratio of the detection angle deviation, when a speed proportional physical value which is a physical value proportional to a rotational angle speed of the rotor is higher than a preliminarily set speed threshold value; and makes the ratio of the estimation actual angle deviation in the control angle deviation lower than the ratio of the detection angle deviation, when the speed proportional physical value is lower than the speed threshold value.

2. The controller for the rotary electric machine according to claim 1, wherein the angle calculator for control makes the ratio of the estimation actual angle deviation increase continuously and makes the ratio of the detection angle deviation decrease continuously, as the speed proportional physical value increases in a preliminarily set range of the speed proportional physical value including the speed threshold value.

3. The controller for the rotary electric machine according to claim 1, wherein the angle calculator for control makes the ratio of the estimation actual angle deviation increase continuously from 0 to 1, and makes the ratio of the detection angle deviation decrease continuously from 1 to 0, as the speed proportional physical value increases in a preliminarily set range of the speed proportional physical value including the speed threshold value;

sets the ratio of the estimation actual angle deviation to 0, and sets the ratio of the detection angle deviation to 1, when the speed proportional physical value is lower than the range of the speed proportional physical value; and sets the ratio of the estimation actual angle deviation to 1, and sets the ratio of the detection angle deviation to 0, when the speed proportional physical value is higher than the range of the speed proportional physical value.

4. The controller for the rotary electric machine according to claim 1, wherein the speed threshold value is set corresponding to the speed proportional physical value at a boundary between an execution region of Id=0 control or maximum torque/current control, and an execution region of magnetic flux weakening control.

5. The controller for the rotary electric machine according to claim 1, wherein the angle calculator for control changes a rotational angle speed for control of the rotor by performing feedback control so that the control angle deviation approaches 0; and calculates the rotational angle for control by integrating the rotational angle speed for control.

6. The controller of rotary electric machine according to claim 5, wherein the voltage command value calculator defines a direction of the rotational angle for control as d-axis, and defines a direction advanced to the d-axis by 90 degrees in an electrical angle as q-axis;

converts the current detection values of the plural-phase windings into current detection values of d-axis and q-axis, based on the rotational angle for control;

changes voltage command values of d-axis and q-axis so that the current detection values of d-axis and q-axis approach current command values of d-axis and q-axis, respectively; and converts the voltage command values of d-axis and q-axis into voltage command values of plural phases, based on the rotational angle for control, wherein the angle calculator for control estimates the estimation actual angle deviation which is a deviation of the rotational angle for control with respect to the true rotational angle of the rotor, based on the current detection values of d-axis and q-axis, the voltage command values of d-axis and q-axis, and the rotational angle speed for control.

7. The controller for the rotary electric machine according to claim 1, wherein the angle calculator for control calculates an upper limit value and a lower limit value of the rotational angle for control, based on the detection value of rotational angle; and corrects the rotational angle for control, based on the detection value of rotational angle, when the rotational angle for control deviates from a range from the upper limit value to the lower limit value.

8. The controller of the rotary electric machine according to claim 1, wherein a response frequency from the control angle deviation to the rotational angle for control is set lower than a rotational frequency corresponding to the speed threshold value.

9. The controller of the rotary electric machine according to claim 1, wherein a response frequency from the control angle deviation to the rotational angle for control is set higher than a mechanical resonance frequency which occurs in the rotational angle speed of the rotor.

10. The controller for the rotary electric machine according to claim 1, wherein a response frequency from the control angle deviation to the rotational angle for control is set between 3 times value and 5 times value of a mechanical resonance frequency which occurs in the rotational angle speed of the rotor.

11. An electric power steering apparatus comprising:

the controller for the rotary electric machine according to claim 1, the electric power converter, the rotary electric machine, and a driving force transmission mechanism which transmits a driving force of the rotary electric machine to a steering apparatus of a vehicle, wherein a response frequency from the control angle deviation to the rotational angle for control is set to 90 Hz or more.

* * * * *